United States Patent

Bailey

[15] 3,700,697
[45] Oct. 24, 1972

[54] (2,3-DIHYDRO-2-BENZOFURANYLMETHYL) GUANIDINES AND THEIR PREPARATION

[72] Inventor: Denis M. Bailey, East Greenbush, N.Y.

[73] Assignee: Sterling Drug Inc., New York, N.Y.

[22] Filed: April 22, 1968

[21] Appl. No.: 723,234

[52] U.S. Cl..........260/346.2 R, 260/239.1, 260/295, 260/257, 260/301, 260/326.14, 260/326, 260/343.7, 424/78, 424/232, 424/285
[51] Int. Cl. ................................................C07d 5/42
[58] Field of Search....................................260/346.2

[56] References Cited

FOREIGN PATENTS OR APPLICATIONS 1,202,285  10/1965  Germany

Primary Examiner—Alex Mazel
Assistant Examiner—Bernard Dentz
Attorney—Elmer J. Lawson, B. Woodrow Wyatt, Thomas L. Johnson, Robert K. Bair, R. Clifford Bourgeois, William G. Webb and Roger T. Wolfe

[57] ABSTRACT

(2,3-Dihydro-2-benzo-furanylmethyl)guanidines and (2,3-dihydro-2-benzofuranylmethyl)-aminoguanidines, having anti-hypertensive activity, are prepared by reacting the corresponding respective 2,3-dihydro-2-benzo-furanylmethylamine or (2,3-dihydro-2-benzofuranylmethyl)hydrazine with a guanylating agent, e.g., 2-(lower-alkyl)-2-thiopseudourea or cyanamide. Preparation of various intermediates are given, e.g., 2,3-dihydro-2-benzofuranylmethyl halides, N-(2,3-dihydro-2-benzofuranylmethyl)phthalimides, 2,3-dihydro-2-benzofuranylmethylamines and (2,3-dihydro-2-benzofuranylmethyl)hydrazines.

7 Claims, No Drawings

(2,3-DIHYDRO-2-BENZOFURANYLMETHYL) GUANIDINES AND THEIR PREPARATION

This invention relates to compositions of matter of the class of substituted benzofurans, to their intermediates and to their preparation.

The invention sought to be patented, in one composition aspect, resides in the compounds of the formula I or II:

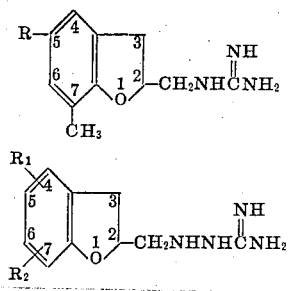

where R is hydrogen or methyl, and, $R_1$ and $R_2$ are each hydrogen, The compounds of formula II and their above-described preparation and the intermediate compounds of formula V are disclosed and claimed in our copending application Ser. No. 204,309, filed Dec. 2, 1971. halo, lower-alkyl or lower-alkoxy. The embodiments of this composition aspect of the invention, when tested according to standard pharmacological evaluation procedures have the inherent applied use characteristics of having pharmacological activity, e.g., anti-hypertensive activity.

The invention sought to be patented, in its process aspect, resides in the process of preparing said compounds of formulas I and II which comprises reacting, respectively, a compound of the formula III or IV:

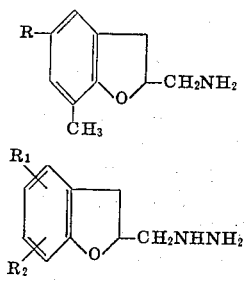

with a guanylating agent, e.g., a 2-(lower-alkyl)-2-thiopseudourea or cyanamide.

The invention sought to be patented in another composition aspect, resides in the intermediate compounds of the formula V

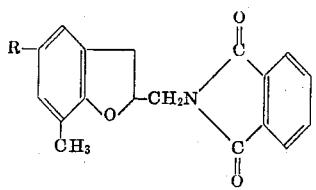

where R is hyrdrogen or methyl.

The term "lower-alkyl," as used herein, e.g., as one of the meanings for $R_1$ or $R_2$ in formulas II or IV, means alkyl radicals having from one to six carbon atoms, illustrated by methyl, ethyl, n-propyl, isopropyl, n-butyl, 2-butyl, isobutyl, n-amyl, n-hexyl, and the like.

The term "halo," as used herein, e.g., as one of the meanings for $R_1$ and $R_2$ in formulas II or IV, means chloro, bromo, iodo or fluoro, with chloro being preferred because of the ready availability and cost advantages of chloro intermediates.

The term "lower-alkoxy," as used herein, e.g., as one of the meanings for $R_1$ or $R_2$ in formulas II or IV, means alkoxy radicals having from one to six carbon atoms, illustrated by methoxy, ethoxy, n-propoxy, isopropoxy, n-butoxy, isobutoxy, amyloxy, n-hexyloxy, and the like.

In free base form each of the novel compounds of formulas I and II or this invention interact with one equivalent of an organic or inorganic acid to form the corresponding acid-addition salt. These acid-addition salts and the free base of course have a common structural entity. The acid-addition salts are the full equivalents of the free base form, and the new compound of this invention includes both the free base and the acid-addition salts thereof. The novel feature of the compound of the invention thus resides in the concept of the base and the cationic forms of the new compounds of formula I or II and not in any particular acid moiety or acid anion associated with the salt form of the compounds; rather, the acid moieties or anions which can be associated in the salt form are in themselves neither novel nor critical and therefore can be any acid anion or acid-like substance capable of salt formation with bases. It will be appreciated that in aqueous solutions the base form and the water-soluble acid-addition salt form of the compounds of the invention possess a common protonated cation or ammonium ion.

Thus the acid-addition salts discussed above and claimed herein are prepared from any organic acid, inorganic acid (including organic acids having an inorganic group therein), or organo-metallic acid as exemplified by organic mono- and poly-carboxylic acids such as found, for example, in Beilstein's Organische Chemie, 4th Ed., Volumes III, IV, IX, X XIV, XVII, XIX, XXI, XXII, and XXV; organic mono- and polysulfonic and -sulfinic acids such as found, for example in Beilstein volumes VI, XI, XVI, and XXII; organic phosphonic and phosphinic acids such as found, for example, in Beilstein volumes XI and XVI; organic acids of arsenic and antimony such as found, for example in Beilstein volumes XVII, XXII, and XXV; acidic ion-exchange resings; and inorganic acids of any acid forming element or combination of elements such as found in Mellow, Comprehensive Treatise on Inorganic and Theoretical Chemistry, Longman's Green and Co., New York, N.Y. volumes I–XVI. In addition, other salt-forming compounds which are acidic in their chemical properties but which are not generally considered as acids in the same sense as carboxylic or sulfonic acids are also considered to be among the numerous acids which can be used to prepare acid-addition salts of the compounds of the invention. Thus there is also comprehended acidic phenolic compounds such as found, for "activited" or acidic hydrogen atoms, as for example, picrolonic acid, or barbituric acid derivatives having an acidic proton such as found, for example, in Cox et al. Medicinal Chemistry, vol. IV, John Wiley and Sons, Inc., New York, N.Y. (1959).

Representative acids for the formation of the acid-addition salts include formic acid, acetic acid, isobutyric acid, alpha-mercaptopropionic acid, trifluoroacetic acid, malic acid, fumaric acid, succinic acid, succinamic acid, glutamic acid, tartaric acid, oxalic acid, pyromucic acid, pamoic acid, citric acid, lactic acid, glycolic acid, gluconic acid, saccharic acid, ascorbic acid, penicillin, benzoic acid, phthalic acid, salicylic acid, acetylsalicylic acid, 3,5-dinitrobenzoic acid, anthranilic acid, cholic acid, 2-pyridinecarboxylic acid, 3-hydroxy-2-naphthoic acid, picric acid, quinic acid, tropic acid, 3-indoleacetic acid, barbituric acid, sulfamic acid, methanesulfonic acid, ethanesulfonic acid, isethionic acid, benzenesulfonic acid, p-toluenesulfonic acid, saccharin, butylarsonic acid, methanephosphonic acid, acidic resins, hydrofluoric acid, hydrochloric acid, hydrobromic acid, hydriodic acid, perchloric acid, nitric acid, sulfuric acid, phosphoric acid, hydrocyanic acid, phosphotungstic acid, molybdic acid, arsenic acid, and the like.

The acid-addition salts are prepared in conventional fashion, for instance either by direct mixing of the acid and the base or, when this is not appropriate, by dissolving either or both of the acid and the base separately in water or an organic solvent and mixing the two solutions, or by dissolving both the acid and the base together in a solvent. The resulting acid-addition salt is isolated by filtration, if it is insoluble in the reaction medium, or by evaporation of the reaction medium to leave the acid-addition salt as a residue.

The acid-addition salts of the compounds of formula I or II are useful, in many instances, not only as pharmacological agents but are also useful, in all instances, as characterizing or identifying derivatives of the free base and in isolation or purification procedures. Moreover, the acid-addition salts react with strong bases, such as alkali metal hydroxides, to generate the free base; and accordingly all of the salts, regardless of considerations of solubility, toxicity, physical form, or the like of a particular species of acid-addition salt, are useful for the purposes of our invention since they are sources of the free base.

It will be appreciated from the above that if one or more of the characteristics, such as solubility, molecular weight, physical appearance, toxicity, or the like of a given acid-addition salt render it less suitable or unsuitable for the particular desired purpose, as for example, use as an anti-hypertensive agent or in an isolation or purification procedure, or the like, the acid-addition salt can be converted to the free base and then to another, more suitable acid-addition salt, for instance, a pharmaceutically-acceptable salt when a pharmaceutical use is involved.

The molecular structures of the compounds of formula I or II of the invention are assigned on the basis of evidence provided by infrared (IR), ultraviolet (UV) and nuclear magnetic resonance (NMR) spectra, by chromatograph mobilities, and, by the correspondence of calculated and found values for the elementary analyses for representative examples.

The manner and process of making and using the invention will now be generally described so as to enable a person skilled in the art of medicinal chemistry to make and use the same, as follows:

The reaction of the compound of formula III or IV with a guanylating agent is carried out preferably by heating the reactants in a mutual solvent, e.g., water, a lower-alkanol such as methanol, ethanol, isopropyl alcohol or other water-miscible alcohols or solvents, or mixtures of water and said alcohols or solvents. The reactants can be used in free base form or in the form of their acid-addition salts, preferably salts with strong inorganic acids or organic sulfonic acids. The preferred guanylating agent is a 2-(lower-alkyl)-2-thiopseudourea, e.g., 2-methyl-2-thiopseudourea, 2-ethyl-2-thiopseudourea. Also useful is cyanamide.

The intermediate 2,3-dihydro-2-benzofuranylmethylamines of formula III and (2,3-dihydro-2-benzofuranylmethyl)hydrazines of formula IV are conveniently prepared from corresponding 2,3-dihydro-2-benzofuranylmethyl halides, e.g., bromides, iodides, using generally known procedures. For example, the 2,3-dihydro-2-benzofuranylmethylamines are prepared by first reacting a corresponding 2,3-dihydro-2-benzofuranylmethyl bromide or iodide with an alkali metal phthalimide, e.g., potassium phthalimide, and then reacting the resulting N-(2,3-dihydro-2-benzofuranylmethyl)phthalimide with hydrazine hydrate. The (2,3-dihydro-2-benzofuranylmethyl)hydrazines are prepared by reacting the corresponding 2,3-dihydro-2-benzofuranylmethyl bromide or iodide directly with hydrazine hydrate.

The starting 2,3-dihydro-2-benzofuranylmethyl halides are prepared in several steps using conventional procedures and known 2-allylphenols. For example, in one procedure, the appropriate 2-allylphenol is reacted with mercuric chloride to form a 2,3-dihydro-2-benzofuranylmethyl mercuric chloride, the latter is reacted with potassium iodide to form the corresponding 2,3-dihydro-2-benzofuranylmethyl mercuric iodide, which is then reacted with iodine and potassium iodide to form the 2,3-dihydro-2-benzofuranylmethyl iodide. In another procedure, the 2-allylphenol is acetylated by reaction with acetic anhydride, the resulting 0-acetyl-2-allylphenol is reacted with bromine to form the 0-acetyl-2-(2,3-dibromopropyl)phenol, which is then reacted with an alkali alkoxide, e.g., sodium methoxide, in a suitable solvent, e.g., ethanol, to form the 2,3-dihydro-2-benzofuranylmethyl bromide.

Further illustrative preparations of the above-noted intermediates and starting materials are given hereinbelow.

The foregoing discussion is offered to illustrate the various aspects of the invention and not to limit its scope. The invention is further illustrated by the following examples.

A. 2,3-dihydro-2-benzofuranylmethyl halide
1. 5-Chloro-2,3-dihydro-2-benzofuranylmethyl iodide This compound was prepared in three steps starting with 2-allyl-4-chlorophenol as follows: A solution containing 131 g. of 2-allyl-4-chlorophenol in 500 ml. of ethanol was added to a solution of 220 g. of mercuric chloride in a mixture of 1500 ml. of water and 1000 ml. of ethanol. After the solution had been stirred for 1 hour at room temperature (about 25°–30° C.), 300 ml. of water was added whereupon a heavy oil separated. An additional 100 g. of mercuric chloride was added to the reaction mixture and stirring was continued for 90 more minutes, after which time the oil had solidified. The solid was collected, washed with water and dried overnight to yield 298 g. of 5-chloro-2,3-dihydro-2-benzofuranylmethyl mercuric chloride. A small sample was recrystallized from ethanol and found to melt at 90°–92 C. A 296 g. portion of 5-chloro-2,3-dihydro-2-benzofuranylmethyl mercuric chloride was powdered and suspended in a solution containing 332 g. of potassium iodide in 1500 ml. of water and the resulting suspension was stirred and heated to boiling where it was maintained for ten minutes. The stirred mixture was allowed to cool and eventually chilled in an ice bath whereupon a heavy gummy precipitate of 5-chloro-2,3-dihydro-2-benzofuranylmethyl mercuric iodide only partially solidified after 2 hours. To the mixture was added another 1500 ml. of water and the resulting reaction mixture was boiled with stirring for about 2 hours at the end of which time the volume was about 1 liter. Another 3 liters of water and 120 g. of potassium iodide were added and the mixture stirred at 80° C. while 186 g. of iodine was added. The mixture was stirred for 30 minutes and then stored at 0° C. overnight. The mixture was extracted with chloroform. The extract was washed with aqueous potassium iodide solution, dried over anhydrous sodium sulfate and concentrated in vacuo to remove the solvent. The remaining oil was distilled under reduced pressure to yield three fractions, b.p. 110°–114° C. at 0.075–0.080 mm., all of which were contaminated with iodine. The fractions were combined, diluted with chloroform, washed with 10 percent aqueous sodium bisulfite solution and evaporated to remove the chloroform to yield 144 g. of 5-chloro-2,3-dihydro-2-benzofuranylmethyl iodide as a pale yellow oil.

2. 2,3-Dihydro-5,7-dimethyl-2-benzofuranylmethyl iodide

To a solution containing 181 g. of mercuric chloride in 3400 ml. of water was added dropwise with stirring 103.8 g. of 6-allyl-2,4-xylenol and the resulting mixture was stirred overnight (about 15 hours). The crystalline precipitate was collected, washed with water and air-dried to yield 2,3-dihydro-5,7-dimethyl-2-benzofuranylmethyl mercuric chloride, a small sample of which was recrystallized from absolute ethanol and found to melt at 95.5°–96.4° C. The 2,3-dihydro-5,7-dimethyl-2-benzofuranylmethyl mercuric chloride was ground into a fine powder and added to a solution containing 318 g. of potassium iodide in 3200 ml. of water. The resulting mixture was heated with stirring to reflux, maintained at reflux for 5 minutes and then allowed to cool while standing overnight. To the mixture containing 2,3-dihydro-5,7-dimethyl-2-benzofuranylmethyl mercuric iodide as a precipitate was added 30 g. of potassium iodide and the resulting mixture heated to reflux for one hour while 163 g. of iodine was added. The mixture was extracted with chloroform. The chloroform extract was washed with 100 ml. of 20 percent potassium iodide solution and then four times with 200 ml. of sodium thiosulfate solution containing 1 g. of sodium thiosulfate per 20 ml. of solution. The chloroform solution was then washed successively with three 250 ml. portions of 10 percent sodium bicarbonate solution and two 250 ml. portions of hot water, then dried by swirling over anhydrous sodium sulfate and filtered through anhydrous sodium sulfate. The filtrate was heated on a steam bath, treated with decolorizing charcoal, filtered through infusorial earth and concentrated in vacuo to remove the solvent. The remaining oil was distilled under reduced pressure to yield 124.6 g. of oil at 121°–124° C. and 1.2 mm. The oil was dissolved in 100 ml. of benzene and the benzene solution washed with three 100 ml. portions of 5 percent aqueous sodium thiosulfate. The aqueous wash was extracted with two 100 ml. portions of chloroform. The organic phases were combined, washed with 1 ml. of water, dried over anhydrous sodium sulfate, filtered through anhydrous sodium sulfate and concentrated on the steam bath to remove the solvent. The remaining oil was distilled under reduced pressure to yield 117.9 g. of 2,3-dihydro-5,7-dimethyl-2-benzofuranylmethyl iodide, b.p. 110°–124° C. at 0.5–1.3 mm.

3. 2,3-Dihydro-7-methyl-2-benzofuranylmethyl bromide

This compound was prepared in three steps starting with 6-allyl-2-cresol, as follows: A solution containing 245 g. of 6-allyl-2-cresol in 500 ml. of acetic anhydride was refluxed for 3 hours and then concentrated under reduced pressure. When an attempt at vacuum distillation indicated incomplete reaction, the distillation was stopped and the fractions and pot residue were recombined, treated with 150 ml. of acetic anhydride and 150 ml. of pyridine, and the resulting solution allowed to stand over the weekend at room temperature (about 25°–30 C.). The solution was poured into a mixture of ice and water and the aqueous mixture was extracted with benzene. The benzene extract was washed successively with dilute aqueous hydrochloric acid, 10 percent aqueous sodium bicarbonate and water; dried over anhydrous sodium sulfate; and, evaporated. The residue was distilled under reduced pressure to yield 220.7 g. of 2-acetoxy-3-allyltoluene, b.p. 138°–141° C. at 26–26.5 mm. The 2-acetoxy-3-allyltoluene was dissolved in 800 ml. of carbon disulfide and the solution treated with 2 g. of powdered anhydrous sodium carbonate. The mixture was cooled below 0° C. and to it was added dropwise with stirring over a period of 2½ hours a solution of 185 g. of bromine and 200 ml. of carbon disulfide. The solvents were removed under reduced pressure and the residual oil mixed with one liter of n-hexane and cooled. When the product separated as an oil, the mixture was evaporated to remove the n-hexane and the remaining 2-acetoxy-3-(2,3-dibromopropyl)toluene was diluted to a volume of 1000 ml. with absolute ethanol. A solution containing 16.2 g. of sodium methoxide in 200 ml. of absolute ethanol was added with stirring to a solution cooled below 10° C. and containing 100 ml. of ethanol and 250 ml. of the above ethanol solution of 2-acetoxy-3-(2,3-dibromopropyl)-toluene. After completion of the addition (1 hour), the mixture was stirred without cooling for 105 minutes and then refluxed for 30 minutes. The solvents were removed under reduced pressure and the residue taken up in chloroform and water. The chloroform layer was separated, dried over anhydrous sodium sulfate, evaporated to remove the solvent and the remaining oil distilled at reduced pressure to yield 31.5 g. of 2,3-dihydro-7-methyl-2-benzofuranylmethyl bromide, b.p. 86°–89° C., at 0.7 mm.

Other 2,3-dihydro-2-benzofuranylmethyl iodides prepared by following the 3-step procedure described in Example A–1 starting with a molar equivalent quantity of the appropriate 2-allylphenol in place of 2-allyl-4-chlorophenol are as follows: 5-bromo-2,3-dihydro-2-benzofuranylmethyl iodide from 2-allyl-4-bromophenyl; 2,3-dihydro-4,6-dimethyl-2-benzofuranylmethyl iodide from 2-allyl-3,5-xylenol; 2,3-dihydro-5-methyl-2-benzofuranylmethyl iodide from 2-allyl-4-cresol; 5,7-dichloro-2,3-dihydro-2-benzofuranylmethyl iodide from 2-allyl-4,6-dichlorophenol; 2,3-dihydro-5-methoxy-2-benzofuranylmethyl iodide from 2-allyl-4-methoxyphenol; 2,3-dihydro-6-methoxy-2-benzofuranylmethyl iodide from 2-allyl-5-methoxyphenol; 5-t-butyl-2,3-dihydro-7-methyl-2-benzofuranylmethyl iodide from 6-allyl-4-t-butyl-2-cresol; 5-n-butyl-2,3-dihydro-2-benzofuranylmethyl iodide from 2-allyl-4-n-butylphenol; 7-chloro-2,3-dihydro-2-benzofuranylmethyl iodide from 2-allyl-6-chloro-phenol; 5-ethoxy-2,3-dihydro-2-benzofuranylmethyl iodide from 2-allyl-4-ethoxyphenol; 2,3-dihydro-6-n-propyl-2-benzofuranylmethyl from 2-allyl-5-n-propylphenol; 7-ethyoxy-2,3-dihydro-5-methyl-2-benzofuranylmethyl iodide from 2-allyl-6-ethoxy-4-cresol; 5-t-butyl-2,3-dihydro-2-benzofuranylmethyl iodide from 2-allyl-4-t-butylphenol; 7-(2-butyl)-2,3-dihydro-2-benzofuranylmethyl iodide from 2-allyl-6-(2-butyl)phenol; 2,3-dihydro-4,6-dimethoxy-2-benzofuranylmethyl iodide from 2-allyl-3,5-dimethoxyphenol; 2,3-dihydro-6,7-dimethoxy-2-benzofuranylmethyl iodide from 6-allyl-2,3-dimethoxyphenol; 7-ethoxy-2,3-dihydro-2-benzofuranylmethyl iodide from 2-allyl-6-ethoxyphenol; 2,3-dihydro-4-methyl-2-benzofuranylmethyl iodide from 2-allyl-3-cresol; 2,3-dihydro-6-methyl-2-benzofuranylmethyl iodide from 6-allyl-3-cresol; 6-chloro-2,3-dihydro-2-benzofuranylmethyl iodide from 2-allyl-5-chlorophenol; and, 5-ethyl-2,3-dihydro-2-benzofuranylmethyl iodide from 2-allyl-4-ethylphenol.

B. N-(2,3-dihydro-2-benzofuranyl-methyl)phthalimides

1. N-(2,3-dihydro-7-methyl-2-benzofuranylmethyl)-phthalimide

A mixture containing 22.7 g. of 2,3-dihydro-7-methyl-2-benzofuranylmethyl bromide and 18.5 g. of potassium phthalimide in 100 ml. of dimethylformamide was heated on a steam bath with stirring for 7½ hours and then allowed to stand overnight at room temperature. A small sample of the reaction mixture was diluted with water and yielded crystals which were collected. The reaction mixture was poured into 500 ml. of a mixture of ice and water; the resulting gummy precipitate was triturated with the crystals obtained from the small sample. After about 30 minutes, the product solidified. The solid was collected, washed with water, crystallized from isopropyl alcohol and then recrystallized from isopropyl alcohol to yield 17.8 g. of N-(2,3-dihydro-7-methyl-2-benzofuranylmethyl)phthalimide, 139.8°–142.6°C. (corr.)

2. N-(2,3-dihydro-5,7-dimethyl-2-benzofuranylmethyl)-phthalimide

A mixture containing 57.5 g. of 2,3-dihydro-5,7-dimethylbenzofuranylmethyl iodide and 37.1 g. of potassium phthalimide in 350 ml. of dimethylformamide was heated on a steam bath overnight (about 15 hours) with stirring. The solvent was taken off under reduced pressure and the residue taken up in about 300 ml. of chloroform. The chloroform solution was washed successively with two 250 ml. portions of water, two 125 ml. portions of 10 percent aqueous sodium hydroxide solution and again with one 250 ml. portion of water. The chloroform solution was dried over anhydrous sodium sulfate, filtered through anhydrous sodium sulfate and the filtrate concentrated in vacuo to remove the chloroform. On standing overnight, the syrupy residue yielded a few crystals and on rubbing with a glass rod the entire residue became crystalline. The crystalline material was dissolved in 500 ml. of hot isopropyl alcohol, filtered and the filtrate seeded with one of the aforesaid crystals. The resulting crystalline precipitate was collected, washed with small portions of mother liquor and dried in vacuo at 55° C. overnight to yield 25.1 g. of N-(2,3-dihydro-5,7-dimethyl-2-benzofuranylmethyl)phthalimide, m.p. 136.8°–138.4° C. (corr.)

C. 2,3-dihydro-2-benzofuranylmethylamines 1. 2,3-Dihydro-7-methyl-2-benzofuranylmethylamine A mixture containing 12.8 g. of N-(2,3-dihydro-7-methyl-2-benzofuranylmethyl)phthalimide, 7 ml. of hydrazine hydrate and 65 ml. of ethanol was refluxed with stirring. After about twenty minutes of refluxing, the entire reaction mixture had solidified. After 65 ml. of ethanol and another 7 ml. of hydrazine hydrate had been added, the mixture combined with the mother liquor from the recrystallization of Example B–1 (200 ml. of isopropyl alcohol containing 1.2 g. of N-(2,3-dihydro-7-methyl-2-benzofuranylmethyl)-phthalimide). The resulting mixture was refluxed with stirring for 1 hour. The solid was collected and washed with isopropyl alcohol. The filtrate was allowed to stand overnight and the additional separated solid collected. The filtrate was evaporated under reduced pressure to yield a mixture of a solid and an oily material. The oily solid was triturated with 25 ml. of isopropyl alcohol and the solid collected by filtration. The solid was washed with another 25 ml. of isopropyl alcohol and the combined filtrate and washings were evaporated to yield 6.8 g. of 2,3-dihydro-7-methyl-2-benzofuranylmethylamine, which was used directly in the following step (Example E–1).

2. 2,3-Dihydro-5,7-dimethyl-2-benzofuranylmethylamine

To a solution containing 38.6 g. of N-(2,3-dihydro-5,7-dimethyl-2-benzofuranylmethyl)phthalimide in a mixture of isopropyl alcohol and a small amount of methanol (total volume about 800 ml.) heated to reflux on a steam bath was added with stirring 31 g. of hydrazine hydrate and refluxing with stirring was continued for 90 minutes. After the reaction mixture had been allowed to stand at room temperature overnight, the precipitated solid was filtered off and washed with isopropyl alcohol. The filtrate and washings were combined and concentrated in vacuo to remove the solvents. The residual oily material was distilled under reduced pressure to yield 7.7 g. of 2,3-dihydro-5,7-dimethyl-2-benzofuranylmethylamine, b.p. 77°–94° C. at 0.06–0.100 mm.

D. (2,3-dihydro-2-benzofuranylmethyl)hydrazines 1. (2,3-Dihydro-7-methyl-2-benzofuranylmethyl)hydrazine To 70 ml. of hydrazine hydrate in 50 ml. of absolute ethanol was added dropwise over a period of 2 hours a solution containing 32.1 g. of 2,3-dihydro-7-methyl-2-benzofuranylmethyl bromide in 150 ml. of absolute ethanol and the resulting solution was refluxed for 19 hours. The solvents were removed under reduced pressure and the residue treated with an excess of 10 percent aqueous sodium hydroxide solution. The basic mixture was extracted with chloroform. The chloroform extract was dried over anhydrous sodium sulfate, filtered and the chloroform removed under reduced pressure. The residue was distilled under vacuum to yield 15.4 g. of (2,3-dihydro-7-methyl-2-benzofuranylmethyl)hydrazine, b.p. 110°–113° C. at 0.5 mm.

2. (5-Chloro-2,3-dihydro-2-benzofuranylmethyl)hydrazine

To a stirred refluxing solution containing 80 g. of 95 percent hydrazine hydrate in 100 ml. of absolute ethanol was added dropwise over an hour with stirring a solution of 72 g. of 5-chloro-2,3-dihydro-2-benzofuranylmethyl iodide in 100 ml. of absolute ethanol. The reaction mixture was heated for twenty-two hours and then the solvents and excess hydrazine were removed under reduced pressure. The residue was diluted with 125 ml. of 10 percent aqueous sodium hydroxide solution, 100 ml. of brine and 100 ml. of water. The aqueous mixture was extracted with chloroform and then saturated with solid sodium chloride and extracted further with chloroform. The combined chloroform extracts were dried over anhydrous potassium carbonate and evaporated in vacuo to remove the chloroform. The remaining oily residue was distilled under reduced pressure to yield 22.5 g. of (5-chloro-2,3-dihydro-2-benzofuranylmethyl)-hydrazine, b.p. 118°–133° C. at 0.09–0.22 mm.

Other (2,3-dihydro-2-benzofuranylmethyl)hydrazines prepared by following the procedure of Example D–2 using a molar equivalent quantity of the appropriate corresponding 2,3-dihydro2-benzofuranylmethyl iodide in place of 5-chloro-2,3-dihydro-2-benzofuranylmethyl iodide are as follows: (5-bromo-2,3-dihydro-2-benzofuranylmethyl)hydrazine, (2,3-dihydro-4,6-dimethyl-2-benzofuranylmethyl)hydrazine, (2,3-dihydro-5-methyl-2-benzofuranylmethyl)-hydrazine, (5,7-dichloro-2,3-dihydro-2-benzofuranylmethyl)hydrazine, (2,3-dihydro-5-methoxy-2-benzofuranylmethyl)hydrazine, (2,3-dihydro-6-methoxy-2-benzofuranylmethyl)hydrazine, (5-t-butyl-2,3-dihydro-7-methyl-2-benzofuranylmethyl)hydrazine, (5-n-butyl-2,3-dihydro-2-benzofuranylmethyl)hydrazine, (7-chloro-2,3-dihydro-2-benzofuranylmethyl)hydrazine, (5-ethoxy-2,3-dihydro-2-benzofuranylmethyl)hydrazine, (2,3-dihydro-6-n-propyl-2-benzofuranylmethyl)-hydrazine, (7-ethoxy-2,3-dihydro-5-methyl-2-benzofuranylmethyl) hydrazine, (5-t-butyl-2,3-dihydro-2-benzofuranylmethyl)hydrazine, [7-(2-butyl)-2,3-dihydro-2-benzofuranylmethyl]hydrazine, (2,3-dihydro-4,6-dimethoxy-2-benzofuranylmethyl)hydrazine, (2,3-dihydro-6,7-dimethoxy-2-benzofuranylmethyl)hydrazine, (7-ethoxy-2,3-dihydro-2-benzofuranylmethyl)hydrazine, (2,3-dihydro-4-methyl-2-benzofuranylmethyl)hydrazine, (2,3-dihydro-6-methyl-2-benzofuranylmethyl)hydrazine, (6-chloro-2,3-dihydro-2-benzofuranylmethyl)-hydrazine and (5-ethyl-2,3-dihydro-2-benzofuranylmethyl)hydrazine.

E. (2,3-dihydro-2-benzofuranylmethyl)guanidine 1. (2,3-Dihydro-7-methyl-2-benzofuranylmethyl)guanidine A mixture containing 6.8 g. of 2,3-dihydro-7-methyl-2-benzofuranylmethylamine and 7.7 g. of 2-ethyl-2-thiopseudourea hydrobromide in 50 ml. of isopropyl alcohol was refluxed for 6 hours and then allowed to stand at room temperature over the weekend. The reaction mixture was evaporated in vacuo to yield a gummy residue which partially crystallized on standing. Trituration of the mixture with isopropyl alcohol completed crystallization. The solid was recrystallized from isopropyl alcohol, washed with cold isopropyl alcohol and dried at 50° C. and 20 mm. for 24 hours to yield 5.8 g. of (2,3-dihydro-7-methyl-2-benzofuranylmethyl)-guanidine as its hydrobromide, m.p. 182.8°–189.0° C. (corr.)

2. (2,3-Dihydro-5,7-dimethyl-2-benzofuranylmethyl)-guanidine

A mixture containing 5.95 g. of 2,3-dihydro-5,7-dimethyl-2-benzofuranylmethylamine, 4.75 g. of 2-methyl-2-thiopseudourea sulfate and 25 ml. of water was refluxed with stirring for 4 hours and allowed to cool to room temperature. The precipitate was collected, washed with small portions of ice water and cool isopropyl alcohol, recrystallized from water, dried in vacuo at 55° C. overnight to yield 3.3 g. of (2,3-dihydro-5,7-dimethyl-2-benzofuranylmethyl)guanidine as its sulfate, m.p. 138.0°–144.0° C.

F. (2,3-dihydro-2-benzofuranylmethyl)aminoguanidine 1. (2,3-Dihydro-7-methyl-2-benzofuranylmethyl)aminoguanidine A mixture containing 15.4 g. of (2,3-dihydro-7-methyl-2-benzofuranylmethyl)hydrazine, 12.1 g. of 2-methyl-2-thiopseudourea sulfate and 100 ml. of water was refluxed with stirring for 4 hours. The solvent was removed in vacuo and the gummy solid residue was recrystallized from methanol-acetonitrile. The resulting gummy solid was washed with acetonitrile and then stirred with a mixture of 100 ml. of isopropyl alcohol and 5 ml. of methanol at 20°–25° C. for 4 hours. The solid was collected, dried overnight at 50° C. and 20 mm. and then recrystallized first from methanolisopropyl alcohol and then water to yield 2.9 g. of (2,3-dihydro-7-methyl-2-benzofuranylmethyl)aminoguanidine as its sulfate, m.p. 190.0°–196.0° C. (corr.)

2. (5-Chloro-2,3-dihydro-2-benzofuranylmethyl)amino-guanidine

A mixture containing 11.4 g. of (5-chloro-2,3-dihydro-2-benzofuranylmethyl)hydrazine, 8.0 g. of 2-methyl-2-thiopseudourea sulfate, 80 ml. of water and 15 ml. of isopropyl alcohol was refluxed with stirring for 6 hours and then allowed to cool to room temperature and stand overnight. The gummy precipitate was collected. An attempt to recrystallize this material from methanolacetonitrile yielded an oil which crystallized on standing. The material was then dissolved in one liter of methanol and the methanol solution passes through a column of chloride-form ion exchange resin (800 ml. wet volume), with a total elution time of 6 hours. Another one liter of methanol was used to wash the column. The combined eluents were evaporated under reduced pressure and the residue taken up in 5 percent aqueous hydrochloric acid. The addition of 6N aqueous hydrochloric acid caused the formation of a cloudy solution. The mixture was washed successively with chloroform and ether, and then evaporated under reduced pressure to yield a solid. The solid was recrystallized once from isopropyl alcohol-ether and once from concentrated hydrochloric acid to yield 3.4 g. of (5-chloro-2,3-dihydro-2-benzofuranylmethyl)aminoguanidine as its sesqui-hydrochloride, m.p. 158.0°–168.0° C. (corr.)

Other (2,3-dihydro-2-benzofuranylmethyl)aminoguanidines prepared by following the procedure described in Example F–1 using a molar equivalent quantity of the corresponding appropriate (2,3-dihydrofuranylmethyl)hydrazine in place of (2,3-dihydro-7-methyl-2-benzofuranylmethyl)hydrazine are as follows: (5-bromo-2,3-dihydro-2-benzofuranylmethyl)aminoguanidine, (2,3-dihydro-4,6-dimethyl-2-benzofuranylmethyl)aminoguanidine, (2,3-dihydro-5-methyl-2-benzofuranylmethyl)aminoguanidine, (5,7-dichloro-2,3-dihydro-2-benzofuranylmethyl)aminoguanidine, (2,3-dihydro-5-methoxy-2-benzofuranylmethyl)aminoguanidine, (2,3-dihydro-6-methoxy-2-benzofuranyl-methyl)aminoguanidine, (5-t-butyl-2,3-dihydro-7-methyl-2-benzofuranylmethyl)aminoguanidine, (5-n-butyl-2,3-dihydro-2-benzofuranylmethyl)aminoguanidine, (7-chloro-2,3-dihydro-2-benzofuranylmethyl)-aminoguanidine, (5-ethoxy-2,3-dihydro-2-benzofuranylmethyl)aminoguanidine, (2,3-dihydro-6-n-propyl-2-benzofuranylmethyl)aminoguanidine, (7-ethoxy-2,3-dihydro-5-methyl-2-benzofuranylmethyl)-aminoguanidine, (5-t-butyl-2,3-dihydro-2-benzofuranylmethyl)aminoguanidine, [7-(2-butyl)-2,3-dihydro-2-benzofuranylmethyl]aminoguanidine, (2,3-dihydro-4,6-dimethoxy-2-benzofuranylmethyl)aminoguanidine, (2,3-dihydro-6,7-dimethoxy-2-benzofuranylmethyl)aminoguanidine, (7-ethoxy-2,3-dihydro-2-benzofuranylmethyl)aminoguanidine, (2,3-dihydro-4-methyl-2-benzofuranylmethyl)aminoguanidine, (2,3-di-hydro-6-methyl-2-benzofuranylmethyl)aminoguanidine, (6-chloro-2,3-dihydro-2-benzofuranylmethyl)aminoguanidine and (5-ethyl-2,3-dihydro-2 -benzofuranylmethyl)aminoguanidine. The foregoing aminoguanidines are isolated in their free base form or in the form of their acid-addition salts, preferably sulfates or hydrochlorides.

The anti-hypertensive activity of the (2,3-dihydro-2-benzofuranylmethyl)guanidines and (2,3-dihydro-2-benzofuranylmethyl)aminoguanidines of the invention was determined in unanesthetized renal hypertensive rats using the photoelectric tensometer foot method described by Kersten, et al., J. Lab. Clin. Med. 32, 1090 (1947). The method of testing for antihypertensive activity is described briefly as follows: Each compound was administered orally, preferably in the form of its pharmaceutically-acceptable acid-addition salt, e.g., sulfate or hydrohalide salt, as a suspension in distilled water with the aid of 1 percent gum tragacanth by stomach tube to groups of three renal hypertensive rats at each of two to four different dose levels graduated at 0.3 to 0.9 logarithmic intervals. The systolic blood pressure was determined for each of the three rats per dose level before medication and at intervals of 1, 2, 4, 6, 24, and 48 hours after medication. For control readings, the rats were considered hypertensive if the systolic blood pressure was 160 mm. Hg or greater. The post-medication mean systolic blood pressure for the three rats per dose level was considered to be lowered significantly if the fall was greater than two standard errors from the control mean systolic blood pressure. When tested by the above-described standard procedure, said compounds of the invention were found to have anti-hypertensive activity when administered at oral dose levels between about 25 and 100 mg./kg.

The compounds of the invention can be prepared for use by dissolving under sterile conditions a salt form of the compounds in water (or an equivalent amount of a non-toxic acid if the free base is used), or in a physiologically compatible aqueous medium such as saline, and stored in ampules for intramuscular injection. Alternatively, they can be incorporated in unit dosage form as tablets or capsules for oral administration either alone or in combination with suitable adjuvants such as calcium carbonate, starch, lactose, talc, magnesium stearate, gum acacia, and the like. Also, the compounds can be formulated for oral administration in aqueous alcohol, glycol or oil solutions or oil-water emulsions in the same manner as conventional medicinal substances are prepared. When used as hypotensive agents, they are formulated and used in the same manner as conventional hypotensive agents, such as reserpine preparations, and indeed can be used advantageously in combination with such hypotensive agents.

(5-chloro-2,3-dihydro-2-benzofuranylmethyl)aminoguanidine was found to have anti-inflammatory activity as measured by inhibition of carrageenin-induced local foot edema in fasted rats generally according to the standard procedure of C. A. Winter, et al., Proc. Soc. Exptl. & Med. 111, 544–547 (1962), as follows: Food is withdrawn from male albino rats, weighing approximately 110–124 gms., 18 hours prior to a single oral medication of the test compound. The compound is administered to at least five rats. One hour following the medication, 0.05 ml. of 1 percent aqueous suspension of carrageenin is injected into the plantar tissue of the right hind foot. Three hours after injections, the rats are sacrificed and the hind feet cut off at the tibio-calcaneo-talar joint for subsequent weighing. The observed differences between the average edema weight of the control and medicated rats is expressed as per cent inhibition of edema. When tested by the above-described procedure, (5-chloro-2,3-dihydro-2-benzofuranylmethyl)aminoguanidine, when administered orally in the form of its sesqui-hydrochloride at 100 mg./kg. was found to produce 48 percent inhibition of local edema due to carrageenin-induced inflammation.

I claim:

1. A compound of the formula

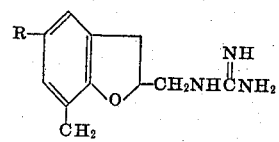

where R is hydrogen or methyl.

2. (2,3-dihydro-5,7-dimethyl-2-benzofuranyl-methyl)-guanidine according to claim 1 having formula I where R is methyl.

3. (2,3-dihydro-7-methyl-2-benzofuranyl-methyl)guanidine according to claim 1 having formula I where R is hydrogen.

4. A method for preparing a compound according to claim 1 which comprises reacting a compound of the formula

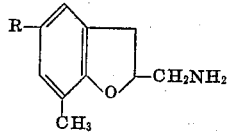

with a guanylating agent.

5. A method according to claim 4 where the guanylating agent is 2-(lower-alkyl)-2-thiopseudourea.

6. A 2-guanidinylmethyl 2,3-dihydrobenzofuran having the formula

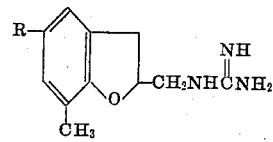

in which R is hydrogen or methyl, and acid addition salts thereof.

7. The compound claimed in claim 6, in which R is a hydrogen atom.

* * * * *